3 Sheets—Sheet 1.
T. SMITH.
Projectile.
No. 14,742.
Patented Apr. 22, 1856
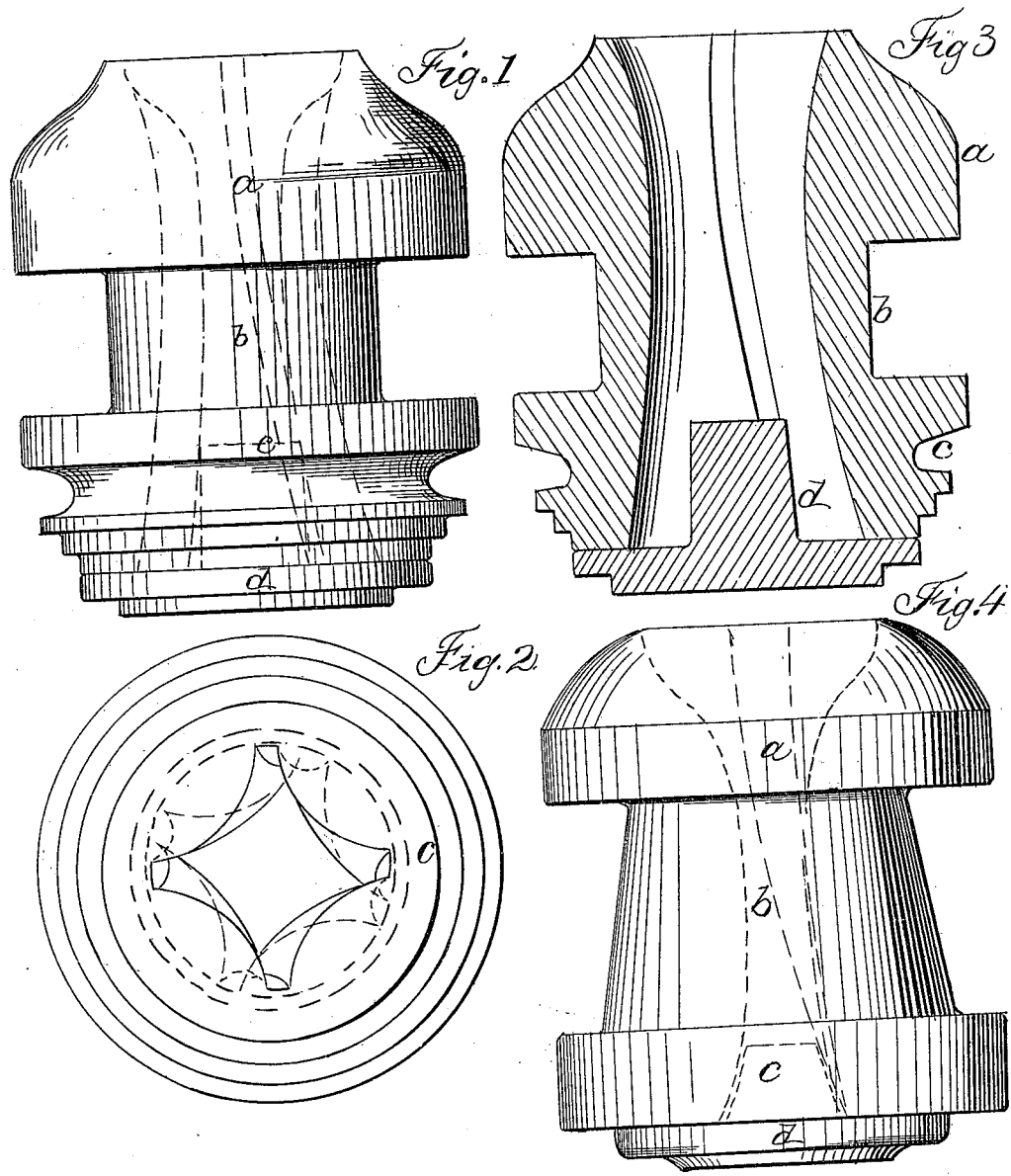

3 Sheets—Sheet 2.

T. SMITH.
Projectile.

No. 14,742.

Patented Apr. 22, 1856.

3 Sheets—Sheet 3.
T. SMITH.
Projectile.
No. 14,742.
Patented Apr. 22, 1856.
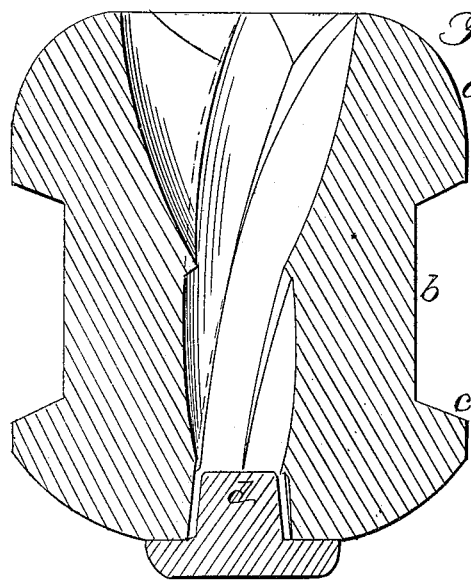
Fig. 9.
Fig. 10.
Fig. 11.
Fig. 12.
Fig. 13.
Fig. 14.
Fig. 15.

UNITED STATES PATENT OFFICE.

THOMAS SMITH, OF PITTSBURG, PENNSYLVANIA.

IMPROVEMENT IN PROJECTILES FOR FIRE-ARMS.

Specification forming part of Letters Patent No. 14,742, dated April 22, 1856.

*To all whom it may concern:*

Be it known that I, THOMAS SMITH, of Pittsburg, in the county of Allegheny and State of Pennsylvania, have invented a certain new and useful Improvement in Balls for Cannon, Muskets, Rifles, or other Fire-Arms, whether of smooth or rifle bore; and I do hereby declare that the following is a full, clear, and exact description thereof, reference being had to the annexed drawings, forming part of this specification, in which—

Figure 5:
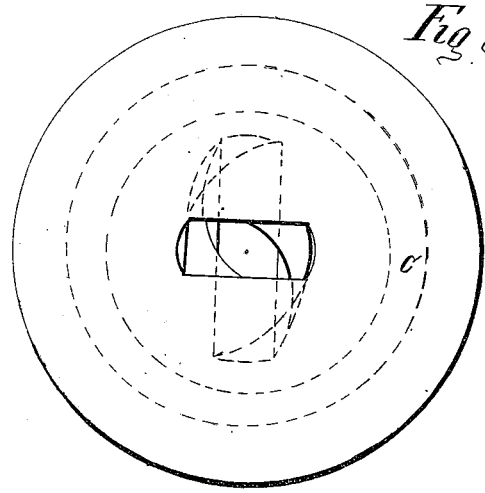
Figure 7:
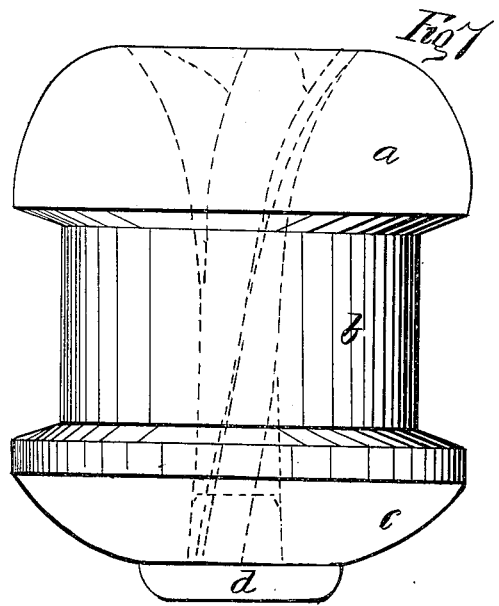
Figure 6:
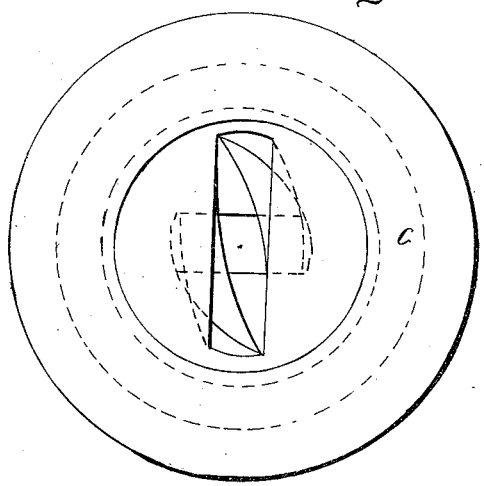
Figure 8:
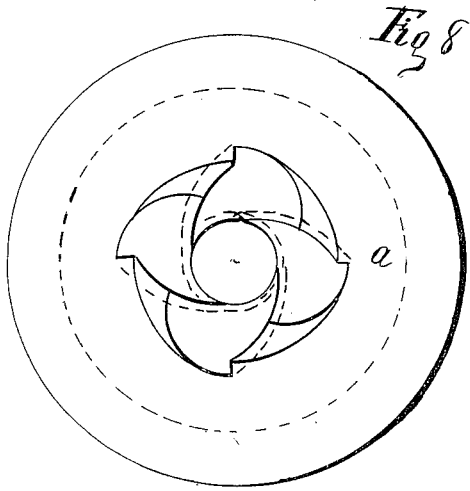
Figure 16:
Figure 17:
Figure 18:
Figure 19:
Figure 20:
Figure 21:
Figure 22:
Figure 23:
Figure 24:

Figures 1, 4, and 7 are each a side elevation of a cannon-ball constructed on my improved plan. Fig. 2 is a view of the hind end of Fig. 1, the dotted lines representing various transverse sections of Fig. 1 at different points toward the front view. Fig. 3 is a longitudinal section of Fig. 1. Fig. 5 is a view from the hind end of Fig. 4, the dotted lines indicating various transverse sections. Fig. 6 is a view from the front end of Fig. 4. Fig. 8 is a top view of Fig. 7, the dotted lines indicating various transverse sections. Fig. 9 is a longitudinal section of Fig. 7. Figs. 10 to 20 are various figures of balls to be fired from smooth-bore guns or muskets. Figs. 10, 11, and 12 are top view, side elevation, and section of one ball. Figs. 13, 14, and 15 are top view, side elevation, and section of another musket-ball. Figs. 16 and 17 are top view and section of another ball. Figs. 18, 19, and 20 are top view and section and under view of another musket-ball. Figs. 21, 22, 23, and 24 are top view, side view, under view, and longitudinal section of a rifle-ball.

My invention consists in making balls for cannon, muskets, smooth-bore guns, or rifles with a spiral cavity, more or less funnel-shaped, passing longitudinally through them for the purpose of giving to them a rotary or spinning motion on their long axis. To accomplish this object the balls ought to be made somewhat longer on one axis than on the other, in order to prevent their getting out of position before leaving the gun and to secure their passage through the air in a line exactly coincident with the axis or center of the spiral cavity.

The spinning motion given to my balls is produced in two ways—one by the passage of the air through the spiral cavity of the ball, the resistance of the air to the passage of the ball forcing the air through the spiral cavity, and thus compelling the ball to rotate or spin with great rapidity on its long axis. In this case the ball is fired with the open end foremost, the cavity gradually contracting toward the near end. This mode of using my balls I consider the best of the two, as securing a longer range and more rapid spinning motion of the ball. The other method is to fire the ball with the smaller end foremost, in which case the rotary motion is produced by the escape rearward of the gas of the powder forced into the cavity in the ball at the time of firing. This always accomplishes the object, but not as fully, in my judgment, as the other mode of using my balls. The same balls may be used in either of these two ways; but as the balls had better be a trifle heavier at the end which is to be the forward end in firing, the balls may be made different in this respect, according to the way they are to be used.

I do not desire to confine myself to any peculiar shape of spiral, nor to the rapidity of the curve, as this may be varied at pleasure, and the several figures in the drawings are not given to show any essential difference in construction, but merely various ways of applying my invention to practical use. I need not, therefore, describe particularly each specimen shown in the several figures.

In Fig. 1, which represents a common ball, *a* is the front end or head of the ball, having a circular opening or mouth of the spiral cavity. This ball is designed to travel through the air with the end *a* foremost. *b* is the neck of the ball, made smaller than either end merely to allow for the increased length of the ball without altering the weight to be used in guns of certain caliber. *c* is the rear end of the ball, which may be made of the shape shown in Fig. 1, or flat, as at Fig. 4, or rounding, as at Fig. 7. The dotted lines in Fig. 1 represent the spiral cavity, which gradually contracts from the mouth of the ball toward the center, as in Fig. 1, and thence either grows larger toward the rear end, as at Figs. 1 and 4, or gradually diminishes all the way to the rear end. In firing these balls a plug or bushing, *d*, (see Figs. 1, 3, 4, 7, and 9,) is inserted into the spiral cavity at the rear end of the ball, to prevent the charge of powder blowing through the cavity instead of exerting its force for the firing of the ball. The head or flat part of this plug must be broad enough to resist the force of the discharge and prevent its being blown through the hole.

The description given of Figs. 1, 2, and 3 applies equally to Figs. 4 and 9.

The musket-balls are made also with a spiral cavity through them. Their exterior shape may be made to suit the fancy of the person using them.

Figs. 13, 14, and 15, and Figs. 18, 19, and 20 represent musket-balls designed to be fired with the small orifice of the screw-cavity at the forward end, depending on the escape backward of the gas from the explosion of the powder through the spiral cavity for the production of the rotating or spinning motion. A cartridge may, if desired, be tied around the rear end of the musket-balls, or they may be fired with or without the use of a wad.

Figs. 10, 11, and 12, and Figs. 16 and 17 represent musket-balls to be fired with the wider orifice of the spiral cavity at the forward end.

Figs. 21, 22, 23, and 24 represent the mode of applying my improvement to rifle-balls, for while it is designed to produce the rotation of the ball by the action of the air there is nothing to prevent the combination of my improvement with the ordinary mode of using a spiral groove in the bore of the rifle, as it is found to add greatly to the efficiency of the rifle by increasing the rapidity of the spinning motion of the ball. My invention, however, is principally applicable to muskets and smooth-bore guns, as with the aid of it, by using balls of my construction, I am enabled to secure a length of range and accuracy of aim unattainable by any other known method in the use of smooth-bore fire-arms. When the ball is fired with the larger orifice of the screw-cavity forward, the air does not present so great a resistance to its passage, as much of the air, instead of being displaced, passes through the spiral cavity, and the resistance of so much of the air as does thus pass through the cavity is exerted directly to the rotation of the ball. Another advantage of my improvement is that the balls do not drift so much as any solid balls.

Having thus described my improvements in the construction of balls for cannon, smooth-bore guns, rifles, and other fire-arms, what I claim as my invention, and desire to secure by Letters Patent, is—

The construction of balls or projectiles for smooth-bore or rifle-bore fire-arms with a spiral cavity, more or less funnel-shaped, passing longitudinally through them for the purpose of giving them a spinning motion on their long axis in their passage through the air.

In testimony whereof I have hereunto set my hand this 28th day of March, A. D. 1856.

THOMAS SMITH.

Witnesses:
WM. N. HOWARD,
W. D. HOWARD.